Figure 1:
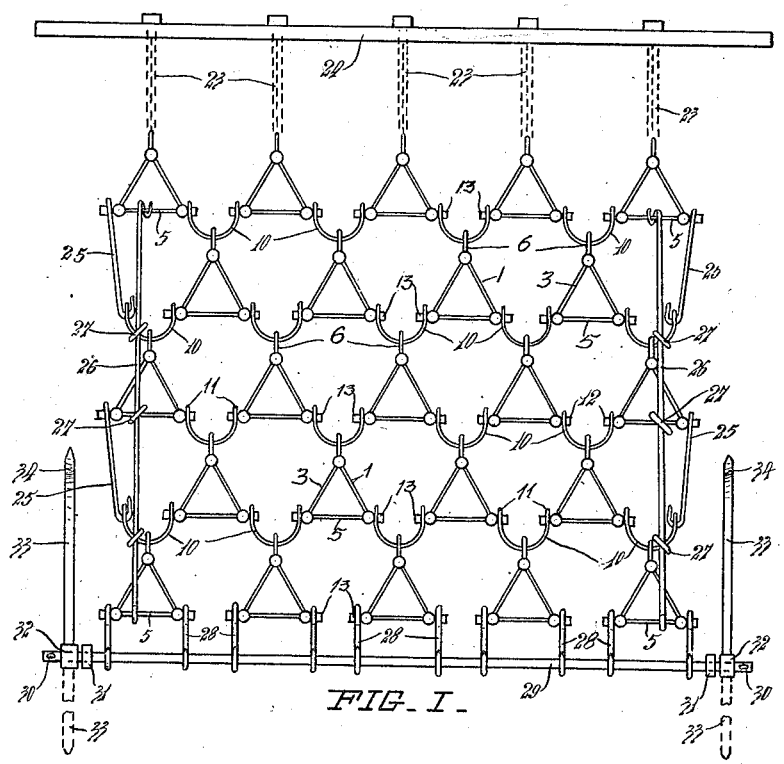

F. T. F. EVANS.
HARROW.
APPLICATION FILED JUNE 3, 1914.

1,136,661.

Patented Apr. 20, 1915.
2 SHEETS—SHEET 1.

Witnesses:-
Charles B Brompton
May G. Luttrell

F. T. F. Evans,
Inventor.
By G. Croydon Marks
Attorney

F. T. F. EVANS.
HARROW.
APPLICATION FILED JUNE 3, 1914.
1,136,661. Patented Apr. 20, 1915.
2 SHEETS—SHEET 2.
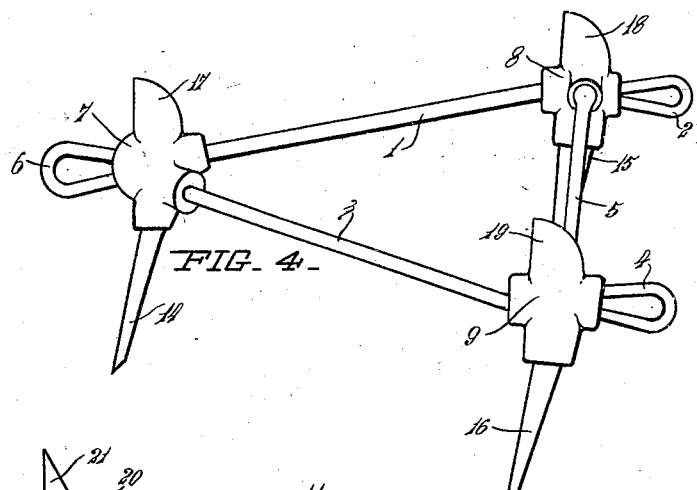
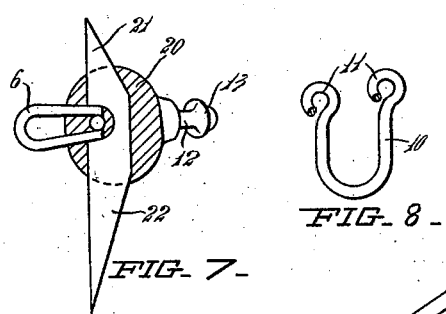
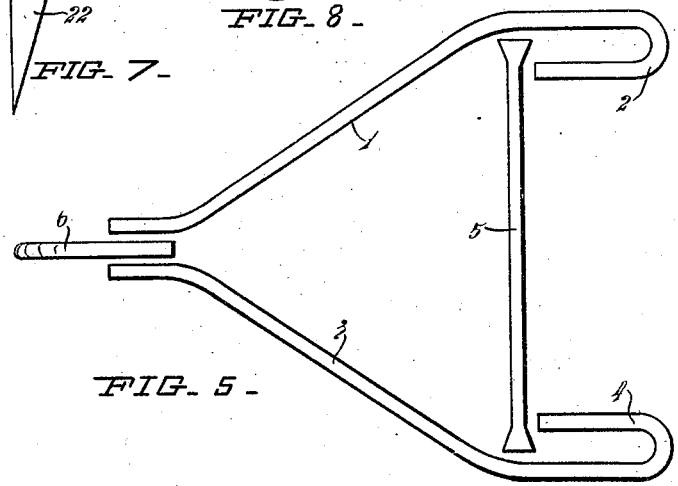
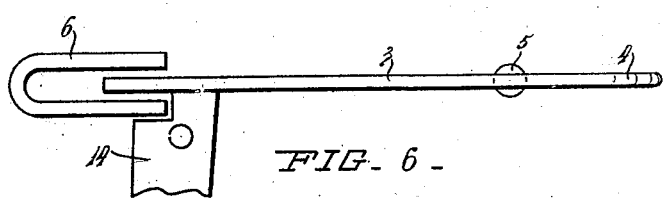
Witnesses
Charles G Crompton
May G. Luttrell
F. T. F. Evans,
Inventor.
By Herndon Marks
Attorney.

UNITED STATES PATENT OFFICE.

FRANCIS THOMAS FINLAY EVANS, OF AUCKLAND, NEW ZEALAND.

HARROW.

1,136,661.  Specification for Design.  Patented Apr. 20, 1915.

Application filed June 3, 1914. Serial No. 842,706.

*To all whom it may concern:*

Be it known that I, FRANCIS THOMAS FINLAY EVANS, a citizen of the Dominion of New Zealand, and residing at Chancery Lane, Auckland, in the Provincial District of Auckland, in the Dominion of New Zealand, have invented certain new and useful Improvements in Harrows, of which the following is a specification.

The invention relates to agricultural harrows, and according hereto a harrow is comprised of a number of triangular units, each having two sets of tines of different length, projecting in opposite directions, whereby deep or shallow tilth may be obtained according to which side up the implement is used.

The units are composed of wrought metal frames, having steel or iron bosses cast upon them in which the tines are embedded. The tines may be of steel or other wrought metal, but preferably the long tines are of wrought metal, and the short tines integrally cast with the bosses.

To enable the tines to be raised from the ground for clearance of weeds some of the front units are connected to rear units by coupling rods and the units in line between them are loosely connected to the rod by links.

The rear members are connected to a transverse bar upon each end of which is journaled a curved arm. The engagement of these arms with the ground while the harrow is dragged forward lifts the transverse bar and raises the harrow.

The invention is illustrated in the drawing wherein:—

Figure 2:
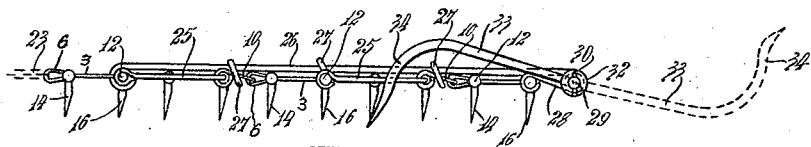

Figure 1, is a plan. Fig. 2, a side elevation, Fig. 3, a similar view showing the harrow raised to clear weeds. Fig. 4, a side perspective elevation of a unit. Fig. 5, a plan showing the wrought metal members which are united to form the unit. Fig. 6, a part side elevation thereof. Fig. 7, a sectional elevation showing a tine entirely of wrought metal, and Fig. 8, an end perspective elevation of a curved link for coupling the units.

Each unit of my harrow is composed of the wrought metal frame members (shown particularly in Figs. 4 and 5), consisting of the side member 1, having the hooked end 2, the side member 3, having the hooked end 4, and the rear tie bar 5. At the forward end of the section is the loop 6. These parts are united by casting upon them the bosses 7, 8 and 9, as shown in Fig. 4, and a plurality of such sections are connected to form a harrow by means of loops 10, one of which is shown in Fig. 8, and which have hooked ends 11, engaging in the loops formed by the hooked ends 2 and 4 of the members of the section.

Instead of forming the hooks upon the ends of the frame members, which hooks, when the bosses are cast upon them, become loops to receive the hooks 11, of the connecting loops 10, I may integrally form with the boss a pin 12 (see Fig. 7) over which the hooks 11, engage, each pin having a head 13 (see Figs. 1 and 7). The tines 14, 15 and 16, are also cast into the bosses and the mold is so shaped that the cast tines, 17, 18 and 19, are produced simultaneously with the production of the bosses. As shown in Fig. 7, the wrought metal tine may project through the cast iron boss 20, so that the short tine 21, as well as the long tine 22, are both of wrought metal.

The front sections of the harrow are connected by chains 23 with the hauling bar 24.

Upon the sides of the harrow the loops 10 are connected to the units by connecting rods 25 having hooked ends. Upon each side of the harrow is a coupling rod 26 which connects the rear tie bar 5 of the front unit with the similar bar of the unit at the back, and oval links 27 loosely connect the coupling rod with the connecting rods and loops. The rear end of the coupling bar has an open hook so that it can be readily disconnected from the rear unit.

Figure 3:
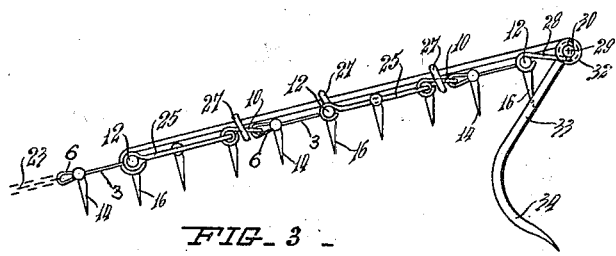

The rear units are connected by removable hooks 28 with a transverse bar 29 upon each end of which is journaled (between a pin 30 and a collar 31) a socket 32 upon an arm 33 having a curved end 34. Generally the arms are trailing behind the harrow as shown in dotted lines, Figs. 1 and 2, but when it is desired to clear the tines of weeds the arms upon each side of the harrow are turned over, into the position shown in full lines, their pointed ends then dig into the ground and the harrow as it is dragged forward is lifted from the rear (as shown in Fig. 3) thereby clearing weeds and the like.

The lifting gear may be readily removed when the harrow is working in clear ground but the coupling rods and links do not interfere with the flexibility of the implement and generally will be allowed to remain in position.

What I do claim and desire to secure by Letters Patent of the United States is:—

1. In an implement of the kind described, a plurality of units, a coupling bar connecting the front and rear units and oval links loosely connecting said bar with intermediate units.

2. In an implement of the kind described, a plurality of units, a coupling bar connecting the front and rear units, links loosely connecting said bar to intermediate units, a transverse bar at the rear of the implement, and arms journaled one upon each end of said transverse bar.

3. In an implement of the kind described, a plurality of units, a coupling bar connecting the front and rear units, means for connecting said bar to intermediate units, a transverse bar at the rear of the implement, hooks for connecting said transverse bar to the rear units, and arms journaled one upon each end of said transverse bar.

In testimony whereof I have signed my name to this specification in the presence of two witnesses.

FRANCIS THOMAS FINLAY EVANS.

Witnesses:
ARTHUR LEWITT FERMYHOUGH,
ETHEL FRANCES COURTNEY.